July 26, 1949.  E. UTTERBACK ET AL  2,477,019
METHOD FOR HEAT-TREATING SOLID INORGANIC ADSORBENTS
Filed Nov. 1, 1944
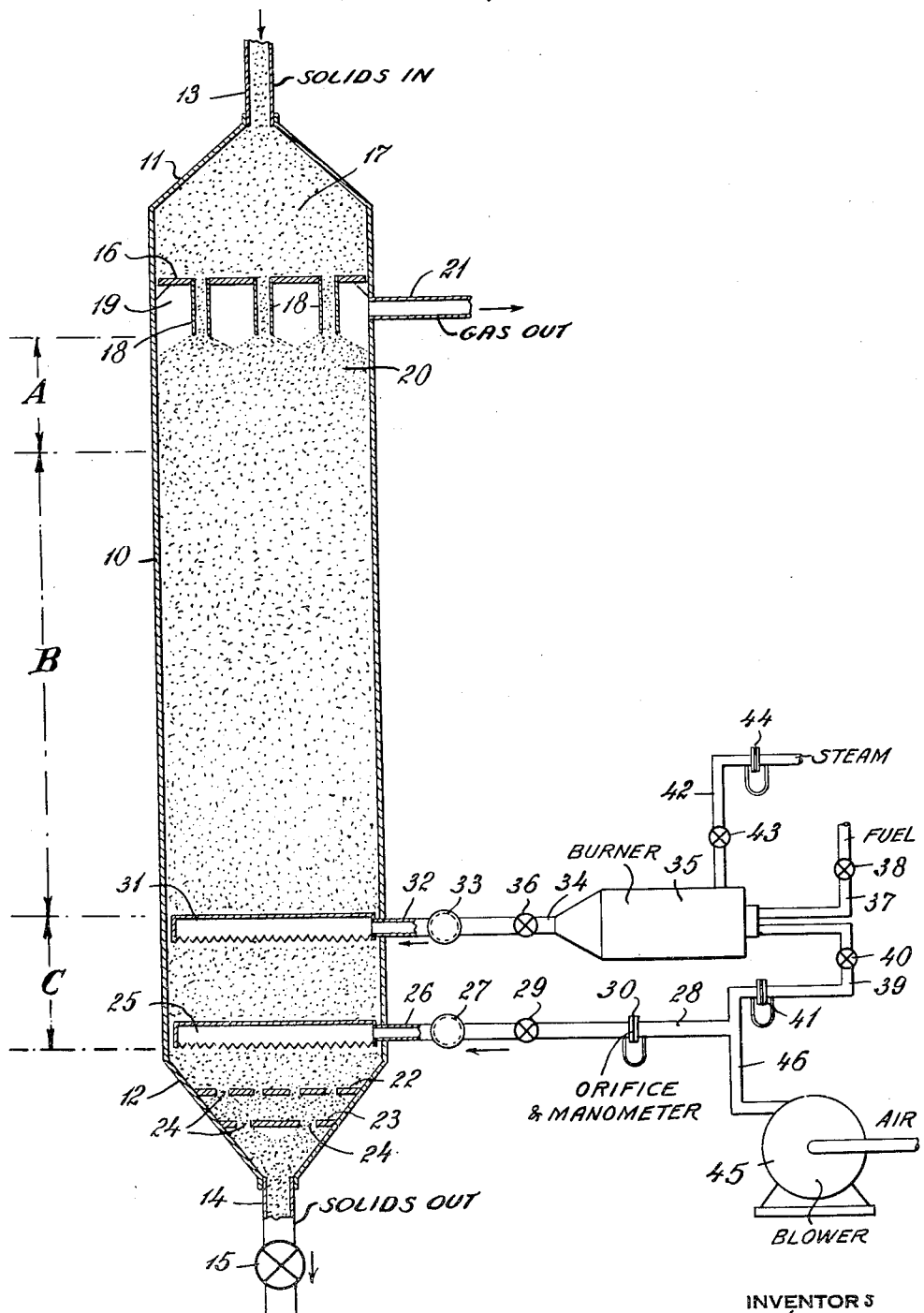
INVENTORS
ERNEST UTTERBACK
ERIC V. BERGSTROM
BY
ATTORNEY Patented July 26, 1949

2,477,019

UNITED STATES PATENT OFFICE 2,477,019

METHOD FOR HEAT-TREATING SOLID INORGANIC ADSORBENTS

Ernest Utterback, Upper Darby, Pa., and Eric V. Bergstrom, Short Hills, N. J., assignors to Socony-Vacuum Oil Company, Incorporated, a corporation of New York Application November 1, 1944, Serial No. 561,478

5 Claims. (Cl. 252—410)

This invention has to do with a method for heat treating particle form solid materials which may be by nature useful for a variety of purposes and particularly for heat treating particle form solid adsorbent materials of the type used for adsorption and catalytic conversion and treating operations. Such solid materials may partake of the nature of natural and treated clays or of certain synthetic associations of silica, alumina or silica and alumina to which other constituents may be added such as certain metallic oxides. Solid materials of the latter variety have become generally known as gel catalysts or gel adsorbents.

Typical of the processes for which such materials may be used is the catalytic cracking conversion of hydrocarbons, it being well known that hydrocarbon gas oils boiling within the approximate range of 450° F. to 750° F. may be converted to gasoline and other products when contacted with certain solid adsorbent materials at temperatures of the order of 800° F. and higher and pressures generally above atmospheric. Carbonaceous contaminants may be deposited upon the solid adsorbent material during the hydrocarbon conversion causing a gradual decline in the catalytic activity of the solid material and requiring periodic regeneration thereof. Such regeneration is generally accomplished by subjecting the solid material to the action of a combustion supporting gas acting to burn the contaminant therefrom at temperatures of the order of 900° F. to 1300° F.

Before the use of freshly prepared solid adsorbent materials for such processes as the above, it has been found necessary to subject them to a heat treatment. Such heat treatment serves several purposes, first, it hardens the solid material particles so as to render them less susceptible to crushing and breakage in use. Second, it stabilizes the catalytic activity of the solid material as regards the hydrocarbon conversion reaction and the amount of contaminant deposition resulting therefrom. Third, it renders the solid material less susceptible to drop in catalytic activity due to the high temperatures involved in the regeneration operation. Such heat treatment involves maintaining the freshly prepared, dried particle form solid material at temperatures of the order of 1000° F. to 1600° F. generally in the presence of controlled amounts of steam containing gases for a controlled period of time. This invention specifically involves an economical method for continuously heat treating such solid adsorbent materials.

A major object of this invention is the provision of a continuous method for heating a particle form solid material to a predetermined treating temperature, maintaining it near said temperature for a fixed period of time and finally cooling said solid material.

A specific object of this invention is the provision in such a heat treating operation, as above described, of a method for conducting the operation within a single vessel while employing the same medium for both heating and cooling the solid material.

A further object of this invention is the provision of a continuous process for heat treating particle form solid adsorbent materials which process is essentially adiabatic in operation.

These and other objects of this invention will become apparent from the following discussion.

Heretofore the methods for heat treating solid adsorbent materials involved stepwise batch processes wherein the solid material was heated in place or continuous processes wherein the solid material was first contacted with hot gas passing therethrough or thereover and later cooled by indirect heat transfer. The batch processes are characteristically low in capacity and high in heat, cooling and labor requirements. The continuous processes generally involve single stage passage of heated gas through or over a mass of solid material causing a temperature gradient across the heat treating zone. The treated solid material is then passed through a cooling zone wherein it is cooled by indirect heat transfer with an external cooling agent.

In a simple form the method of this invention consists of passing the particle form solid material as a substantially compact column downwardly through a suitable vessel while introducing a large volume of cold gas into the column near its lower end and passing it through said column countercurrently to the direction of solid material flow thereby cooling the solid material leaving the lower end of said vessel and heating the solid material within the upper end of said vessel to the desired treating temperature. At the same time a smaller quantity of preheated gas is admitted to said column at a level somewhat above the level of cold gas introduction and passed upwardly through said column to compensate heat required for moisture evaporation or any heat losses from the system involved in the operation.

The invention may be more readily understood by reference to the drawing, which is a diagrammatic view, partially in section, of a heat treating apparatus adapted for operation according to the method of this invention.

In the drawing, 10 represents the shell of a substantially vertical vessel closed on its upper end by converging section 11 and on its lower end by converging section 12. The vessel may be of circular, rectangular or other cross-sectional contour. A conduit 13 is connected into the upper end of the vessel for admittance of particle form solid material and a conduit 14 having flow throttle valve 15 thereon is provided at the bottom of the vessel for solid material discharge. A partition 16 is supported across the vessel near its upper end so as to provide a feed chamber 17 within the upper end of the vessel. Uniformly distributed pipes 18 depend from the partition 16 and terminate a fixed distance therebelow so as to provide a gas disengaging space 19 within the upper section of the vessel and confined passages for solid material flow therethrough to the surface 20 of the column of solid material maintained within the vessel. A gas outlet conduit 21 is connected to the vessel near the upper end of the gas disengaging space 19. It will be apparent that the upper end of the vessel 10 may be left open, if desired, and means, other than that shown, provided for introduction of solid material to the surface 20 of the column within the vessel and for disengagement and withdrawal of effluent gas. Partitions 22 and 23 spaced vertically apart are supported across the converging drain section 12 of the vessel. Orifices 24 through the partitions are suitably distributed so as to cause the division of the solid material flow into a plurality of streams proportionately distributed with respect to the vessel cross-section, which streams are then gradually and proportionately recombined into a single stream discharging through the conduit 14. The partition and orifice arrangement thus serves to provide uniform withdrawal of solid material from the entire cross-section of the column thereof within the vessel. Any other construction properly designed to serve the same purpose may be alternately substituted for the arrangement shown. A row of suitable gas distributor members 25 are provided across the vessel shortly above the bottom section 12. These members may comprise inverted angles or channels open on their bottoms and spaced horizontally apart across the vessel. Gas inlet pipes 26 are provided for each distributor member, and these pipes connected into a manifold 27 to which gas may be introduced through an inlet pipe 28. A flow control valve 29 and flow indicator 30 are provided on the inlet pipe 28. A similar row of distributor members 31 is provided across the vessel at a fixed vertical interval above the members 25. These members are provided with inlet pipes 32 which connect into manifold 33 to which is connected inlet pipe 34 connecting the manifold 33 with the dischage from a line type gas heater 35. A valve 36 is provided on the pipe 34. The heater is provided at its opposite end with a fuel inlet 37 having valve 38 thereon and a gas inlet 39 having a valve 40 and flow indicator 41 thereon. A steam inlet pipe 42 having valve 43 and flow indicator 44 thereon is also connected into the heater 35. The gas inlet pipes 28 and 39 are both connected to the discharge of a blower or gas compressor 45 through a conduit 46. It will be understood that the structure of the gas distributing members, the external gas manifolding and the means for heating gas are intended as exemplary and certain equivalent constructions which will readily suggest themselves to those skilled in the art are also intended to be included within the scope of this invention.

As a typical example of the operation of this apparatus in accordance with the method of this invention, the process of heat treating freshly prepared and dried adsorbent materials may be considered. In a preferred operation, particle form catalyst, after drying, may be introduced to the heat treating vessel through conduit 13 at a temperature of say 100° F. As the solid material passes slowly downwardly through that uppermost portion of the vessel represented as zone A, it may be heated to about 1300° F. by the upwardly flowing gas. It will be maintained at approximately 1300° F. during its passage through zone B, which passage may require from 2 to 12 hours. During its passage through zone C between the two rows of distributor members 31 and 25, the solid will be cooled to about 100° F. by the cold gas admitted through the distributors 25 and passing upwardly therefrom. The solid material is slowly drained from the bottom of the vessel through conduit 14 and flow control valve 15 thereon, either continuously or intermittently, as desired. The partition and orifice arrangement in the drain section 12 provides uniform withdrawal and uniform downward flow of the solid material across the entire column cross-section. Any suitable gas, preferably inert, such as air or flue gas, may be passed from blower 45 through conduits 46 and 28 into manifold 27 and thence through pipes 26 under the distributor members 25. The flow of gas is controlled by means of indicator 30 and valve 29 at substantially that rate required to cool the heat treated and discharging solid material from 1300° F. to about 100° F. within the zone C. The gas upon reaching a level near the distributor members 31 has reached about 1300° F. due to the proper control of its rate of flow and to the very high rate of heat transfer between the solid material and the gas. The gas then passes upwardly through the zone B without considerable heat exchange with the solid material and then through zone A wherein it is gradually cooled to an outlet temperature of about 105° F. while preheating the solid material. Thus a nearly adiabatic type of operation is provided, a small amount of heat being lost in the effluent stack gas and a small amount being lost by natural radiant and convective heat losses from the vessel 10 which should be insulated. This small heat loss is compensated by diverting a relatively small amount of air from the blower 45 through conduit 39 into the line burner 35 wherein it is heated to a temperature preferably of the order of 1300°–1350° F. by combustion of a suitable fuel such as light hydrocarbon gas admitted through inlet 37. This preheated gas then passes through conduit 34, manifold 33 and inlet pipes 32 under the distributor members 31 from which it flows into the column of solid material and upwardly therethrough along with the air admitted at the distributor members 25 below. The inlet temperature and rate of flow of the relatively small stream of gas thus introduced is controlled to balance any heat lost from the system and so control the solid material temperature within the zone B at the desired treating level. It will be observed that the inlet temperature of all the gas entering zone B may be near that temperature which is to be maintained in said zone thereby eliminating substantial temperature gradients across the treating zone. Moreover, by the flow upwardly through all sections of the column of solid material within zone B of a large quantity of gas at the desired treating temperature close and even temperature control of the solid material is provided in all sections of the treating zone. It will be understood that the operation described is typical of continuous operation after conditions have been lined out; a somewhat greater heat input may be required in "starting up" the operation.

It is often desirable to pass the solid material directly from a drier to the heat treating apparatus without cooling, in which case it may enter the apparatus at about 225° F. This solid material may contain limited amounts of moisture which must be removed in the upper section of the heat treating vessel. It may also be desirable to discharge the treated material at a temperature sufficiently high to prevent moisture condensation when a pneumatic conveyor system is used to convey the treated solid material to storage. In such case, the outlet temperature of the solid material may be of the order of 250° F.–400° F. In such operations the cooling gas will enter the distributors 25 at atmospheric temperature or the cooling gas may be stack gas entering at temperatures of the order of 200° F.–300° F. and said gas may leave the top of the vessel at about 230° F. to 300° F. Obviously some heat will be carried from the system with such operation and a somewhat greater rate of preheated gas introduction through distributors 31 will be required than in the original example. It will be noted, however, that the method of this invention, even in such an operation as last described, still provides the nearest approach to an adiabatic operation permissible by solid material inlet and outlet temperatures as controlled by requirements of outside systems.

It is common practice in operations involving heat treatment of solid adsorbent materials to contact said solid materials with controlled partial pressures of steam under the heat treating temperature conditions. Such steam contact greatly accelerates the heat treating operation. In the apparatus shown, controlled quantities of steam may be admitted through inlet 42 into the line heater 35 and conducted along with the preheated gas under the distributors 31 and thence upwardly through the column of solid material. The amount of steam thus admitted may vary from 1% to 20% by volume of the total gas flow upwardly through zone B depending upon the solid adsorbent being treated and the desired severity of the treatment.

It will be apparent that the method of this invention while permitting close and accurate control of the solid material temperature during the heat treatment thereof, also permits considerable simplification in apparatus construction and auxiliary apparatus requirements with resultant decrease in cost thereof and also a decrease in the amount of heat which must be supplied from external sources and in the amount of heat that must be removed from the system by external mediums with resultant marked reduction in operation costs as compared with methods formerly used for heat treating particle form solid adsorbent materials.

In operation, the required length of solid material column to be provided for zones A, B and C will depend upon the rate of solid material flow, the required treating time and the rate of heat transfer between the gas and solid material involved. In one typical operation wherein a particle form solid adsorbent material, used for catalytic hydrocarbon conversion, entered the treater at 225° F. and was discharged at 400° F. and was maintained at about 1300° F. for about 8 hours, the length of zones A, B and C were approximately 4, 14 and 4 feet respectively; and the ratio of cold gas input to the lowermost distributors as compared with hot gas input to the upper row of distributors was of the order of three to one.

It should be understood that the foregoing description of the method of this invention and examples of its applications and of the apparatus to which it may be applied are merely exemplary in character and are not intended to limit the scope of this invention except as it is limited in the following claims.

We claim:

1. A method for heat treating particle form inorganic solid absorbent material at controlled elevated temperatures comprising: passing said adsorbent as a substantially compact column at a controlled rate downwardly through a substantially vertical confined zone in the upper section of which it is preheated from an inlet temperature below about 400° F. to a suitable treating temperature within a narrow range of treating temperatures lying above about 1000° F., in the intermediate section of which it is maintained within said narrow range of treating temperatures and in the lower section of which it is cooled back substantially to its inlet temperature, said intermediate section constituting a major portion of the length of said column, inroducing a substantially inert gas into the lower section of said zone at a temperature near the inlet temperature of the adsorbent entering the upper section and at a rate which will effect the cooling of said solid adsorbent back substantially to its inlet temperature while said gas is heated substantially to said heat treating temperature range, also introducing into said column between said treating and cooling zones substantially inert gas preheated to a temperature above said treating temperature range at a rate substantially below that of said first named gas and passing said gas along with said first gas, flowing upwardly from said cooling section, upwardly through said column of solid material in said treating and solid preheating sections to control the solid material substantially at said treating temperature throughout said intermediate section and to accomplish the solid preheating within said upper section, and finally withdrawing said first and second named gases from said confined zone near the upper end of said column of solid material at a temperature near that of the entering solid material, whereby substantially all the heat recovered from the solid material in the cooling section is transferred to the solid material in said preheating section, the rate of introduction of said second named gas being so controlled as to substantially maintain an overall heat balance over said confined zone.

2. A method for heat treating a porous particle form inorganic adsorbent material which comprises: moving said particle form inorganic adsorbent as a substantially compact column through an elongated confined zone wherein it is first preheated from a supply temperature within the range atmospheric temperature to about 400° F. to a temperature within a narrow range of heat treating temperatures lying within the broader range about 1000° F. to 1600° F., then maintained within said narrow range of heat treating temperatures for a set period within the range 2 to 12 hours as controlled by regulation of the rate of adsorbent flow and finally cooled to an outlet temperature which is within the range atmospheric to 400° F., introducing a substantially inert gas stream at a temperature which is not above said adsorbent supply and outlet temperatures into the adsorbent outlet end of said confined zone, passing said gas stream through said column of adsorbent in a direction counter-current to the direction of adsorbent flow and withdrawing it from the adsorbent supply end of said column, controlling the rate of flow of said gas stream to effect cooling of said adsorbent from said narrow range of heat treating temperatures to said adsorbent outlet temperature within a minor fraction of the total column length located near the adsorbent outlet while said gas is heated to said range of heat treating temperatures and also to effect preheating of the adsorbent from said supply temperature to said narrow range of heat treating temperatures in a short length of said column near the adsorbent inlet which constitutes a minor fraction of the total column length, whereby the heat removed from the adsorbent leaving said column is substantially all returned to the adsorbent entering said column, simultaneously introducing a stream of substantially inert gas containing about 1-20 percent by volume of steam at a controlled rate and at a temperature above said narrow range of heat treating temperatures, into said confined zone approximately at that location therein wherein the cooling effect of said first stream of gas becomes negligible, the rate of introduction of said second stream being substantially less than that of said first stream, passing said preheated gas along with said first named gas stream through the remaining length of said column, and regulating the inlet temperature and rate of said second gas stream to supply to said zone a quantity of heat substantially equal to the overall net heat removed therefrom whereby the adsorbent is maintained within said narrow range of heat treating temperatures throughout an intermediate portion of said column which constitutes a major fraction of the total column length.

3. A substantially adiabatic process for heat tempering porous particle form inorganic catalytic materials to improve the hardness and catalytic stability of said materials which process comprises: passing said catalytic material as a substantially compact column of particles downwardly through a vertical confined zone in the upper section of which it is preheated from a substantially atmospheric inlet temperature to a temperature within a narrow range of tempering temperatures within the broader range about 1000–1600° F., in the intermediate and longest section of which it is maintained within said narrow range of tempering temperatures for a period of about 2–12 hours and in the lower section of which it is cooled back substantially to atmospheric temperature, introducing a stream of air at substantially atmospheric temperature into the lower section of said zone at a rate which will effect the cooling of said catalytic material to atmospheric temperature while the air is heated substantially to said heat tempering range of temperatures, introducing into said column between said treating and cooling sections at a rate substantially below that of said first named gas stream a stream of substantially inert gas containing about 1-20 percent by volume of steam, said gas having been preheated to a level slightly above said narrow range of heat tempering temperatures, passing said second gas stream along with said first gas, flowing upwardly from said cooling section, upwardly through the treating and solid preheating sections of said column to control the catalytic material substantially within said narrow range of heat tempering temperatures throughout said longest intermediate section and to accomplish the preheating of said catalytic material in said upper section and finally withdrawing the gases from said confined zone near the upper end of said column at substantially atmospheric temperature whereby substantially all the heat recovered from the catalytic material in the cooling section is transferred to the catalytic material in the preheating section, the rate of introduction of said second named gas being controlled to maintain an overall heat balance over said confined zone.

4. A substantially adiabatic process for heat treating particle form inorganic adsorbent materials at controlled elevated temperatures which comprises: passing said adsorbent material through a series of three superimposed zones to the first of which it is supplied at a temperature below about 400° F. and in the second of which it is maintained within a narrow range of heat treating temperatures lying above about 1000° F. and from the third of which it discharges at substantially its supply temperature to said first zone, the second of said zones being substantially longer in length than the other two zones, introducing into said third zone at a temperature below about 300° F. a gas which is substantially inert to thermal decomposition at said narrow range of heat treating temperatures and passing it as a stream through said series of three zones in contact with said adsorbent and countercurrently thereto, the rate of introduction of said gas being substantially that required to cool said adsorbent within said third zone from said narrow range of heat treating temperatures to said outlet temperature while permitting the gas temperature to rise substantially to the narrow range of heat treating temperatures, preheating a second stream of gas also inert to thermal decomposition at said narrow range of heat treating temperatures to a temperature above said narrow range of heat treating temperatures and introducing it into the lower end of said second zone at a controlled rate substantially below that of said first named gas and passing said second gas through said second and first zones along with said first gas to maintain the solid material within said second zone within said narrow range of heat treating temperatures and to preheat the adsorbent within said first zone from its inlet temperature to said narrow range of heat treating temperatures while said gas is cooled to an outlet temperature near the adsorbent inlet temperature to said first zone whereby substantially all of the heat recovered from the adsorbent in said third zone is transferred to said adsorbent in said first zone, the inlet temperature of said second stream of gas and the controlled rate of flow thereof being such as to substantially balance the net overall heat removal from said series of three zones.

5. The method of claim 4 characterized in that said second gas stream contains a sufficient proportion of steam to provide a gas atmosphere in the heat treating zone containing between 1-20 percent by volume of steam.

ERNEST UTTERBACK.
ERIC V. BERGSTROM.

REFERENCES CITED

The following references are of record in the file of this patent:

UNITED STATES PATENTS

| Number | Name | Date |
|---|---|---|
| 1,562,550 | Hall | Nov. 24, 1925 |
| 1,573,533 | Barr | Feb. 16, 1926 |
| 2,112,643 | Baensch et al. | Mar. 29, 1938 |
| 2,245,664 | Gronert | June 17, 1941 |
| 2,351,875 | Payne | June 20, 1944 |
| 2,391,116 | Ashley | Dec. 18, 1945 |